United States Patent
Sun et al.

(10) Patent No.: US 11,475,151 B2
(45) Date of Patent: Oct. 18, 2022

(54) SECURITY POLICY MANAGEMENT FOR DATABASE

(71) Applicant: International Business Machines Corporation, Armonk, NY (US)

(72) Inventors: Sheng Yan Sun, Beijing (CN); Shuo Li, Beijing (CN); Xiaobo Wang, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 17/008,784

(22) Filed: Sep. 1, 2020

(65) Prior Publication Data

US 2022/0067180 A1    Mar. 3, 2022

(51) Int. Cl.
| | |
|---|---|
| *G06F 17/00* | (2019.01) |
| *G06F 21/62* | (2013.01) |
| *G06F 16/23* | (2019.01) |
| *G06F 16/22* | (2019.01) |
| *G06F 21/60* | (2013.01) |
| *H04L 29/06* | (2006.01) |

(52) U.S. Cl.
CPC ...... *G06F 21/6218* (2013.01); *G06F 16/2282* (2019.01); *G06F 16/2379* (2019.01); *G06F 21/604* (2013.01)

(58) Field of Classification Search
CPC ............. G06F 16/2282; G06F 16/2379; G06F 21/604; G06F 21/6218
See application file for complete search history.

(56) References Cited

U.S. PATENT DOCUMENTS

| | | | | |
|---|---|---|---|---|
| 7,353,231 | B1* | 4/2008 | Eslambolchi | G06F 16/283 707/602 |
| 7,779,113 | B1* | 8/2010 | Samar | G06F 21/552 709/224 |
| 9,275,096 | B2 | 3/2016 | Strain et al. | |
| 9,600,685 | B2* | 3/2017 | Cherel | G06F 21/6227 |
| 10,560,487 | B2* | 2/2020 | Shulman-Peleg | H04L 63/1441 |
| 2005/0004942 | A1* | 1/2005 | Madsen | H04L 41/0893 |

(Continued)

OTHER PUBLICATIONS

"Aug. 2019 FTB (Fast Traversal Block): Just another TLA?", Segus, Mar. 6, 2020, 4 pages, <https://www.segus.com/2019-08-ftb-fast-traversal-block-for-fit-fast-index-traversal/>.

(Continued)

*Primary Examiner* — Gary S Gracia
(74) *Attorney, Agent, or Firm* — Edward J. Wixted, III

(57) ABSTRACT

In an approach, a processor obtains a plurality of security policies for managing security of a database, the security policies defining respective sets of items to be monitored. A processor stores, respectively, the sets of items defined by the plurality of security policies in one or more item tables based on a predetermined criterion, the predetermined criterion comprising security policy relevance, security policy structure, and available space in the one or more item tables. A processor creates, for each of the one or more item tables, one or more respective index tables associated with the items in the respective item table. A processor creates, for each of the one or more item tables, a fast traverse block (FTB) associated with the created one or more respective index tables.

20 Claims, 6 Drawing Sheets

(56) References Cited

U.S. PATENT DOCUMENTS

| | | | |
|---|---|---|---|
| 2006/0059154 A1* | 3/2006 | Raab | H04L 63/102 |
| | | | 707/999.009 |
| 2009/0094193 A1* | 4/2009 | King | G06F 21/6227 |
| 2010/0169639 A1* | 7/2010 | Jeffries | G06Q 30/06 |
| | | | 713/153 |
| 2011/0131190 A1* | 6/2011 | Pooley | G06F 12/1483 |
| | | | 707/784 |
| 2013/0024916 A1* | 1/2013 | Evans | G06Q 20/386 |
| | | | 726/5 |
| 2014/0380404 A1* | 12/2014 | Raj | G06F 21/6218 |
| | | | 726/1 |
| 2018/0032747 A1* | 2/2018 | Whelan | G06F 16/2282 |
| 2018/0060603 A1* | 3/2018 | Ahmed | G06F 16/2379 |
| 2018/0285406 A1* | 10/2018 | Shah | G06Q 10/063116 |
| 2018/0300370 A1* | 10/2018 | Brookler | G06F 16/24553 |
| 2019/0036887 A1* | 1/2019 | Miller | G07C 9/20 |
| 2019/0050577 A1* | 2/2019 | Kulagin | G06F 21/577 |
| 2020/0201827 A1* | 6/2020 | Chacko | H03M 13/373 |
| 2021/0021637 A1* | 1/2021 | Srivastava | H04L 63/0876 |
| 2021/0097194 A1* | 4/2021 | Khanduja | H04W 12/08 |
| 2021/0149868 A1* | 5/2021 | Li | G06N 5/04 |
| 2021/0209077 A1* | 7/2021 | Snellman | G06F 16/219 |
| 2022/0038428 A1* | 2/2022 | Rodniansky | G06N 5/022 |
| 2022/0067180 A1* | 3/2022 | Sun | G06F 16/2379 |

OTHER PUBLICATIONS

"Fast index traversal", IBM, printed Mar. 6, 2020, 4 pages, <https://www.ibm.com/support/knowledgecenter/SSEPEK_12.0.0/perf/src/tpc/db2z_fastindextraversal.html>.

Hoshikawa et al., "DB2 12 In-Memory Feature: Fast Index Traversal", printed Mar. 6, 2020, 4 pages, <https://www.idug.org/p/bl/et/blogaid=646>.

Mell et al., "The NIST Definition of Cloud Computing", Recommendations of the National Institute of Standards and Technology, Special Publication 800-145, Sep. 2011, 7 pages.

\* cited by examiner

SECURITY POLICY MANAGEMENT FOR DATABASE

BACKGROUND

The present invention relates generally to the field of databases, and more particularly to managing security policies defined for a database.

Databases are wildly used in many areas, such as business areas, academic areas, etc., for managing a large amount of data. In many areas, such as the business areas, security of databases is significantly important. Therefore, a security system that defines a plurality of security policies is built for managing the security of the database.

SUMMARY

Aspects of an embodiment of the present invention disclose a method, computer program product, and computer system. A processor obtains a plurality of security policies for managing security of a database, the security policies defining respective sets of items to be monitored. A processor stores, respectively, the sets of items defined by the plurality of security policies in one or more item tables based on a predetermined criterion, the predetermined criterion comprising security policy relevance, security policy structure, and available space in the one or more item tables. A processor creates, for each of the one or more item tables, one or more respective index tables associated with the items in the respective item table. A processor creates, for each of the one or more item tables, a fast traverse block (FTB) associated with the created one or more respective index tables.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
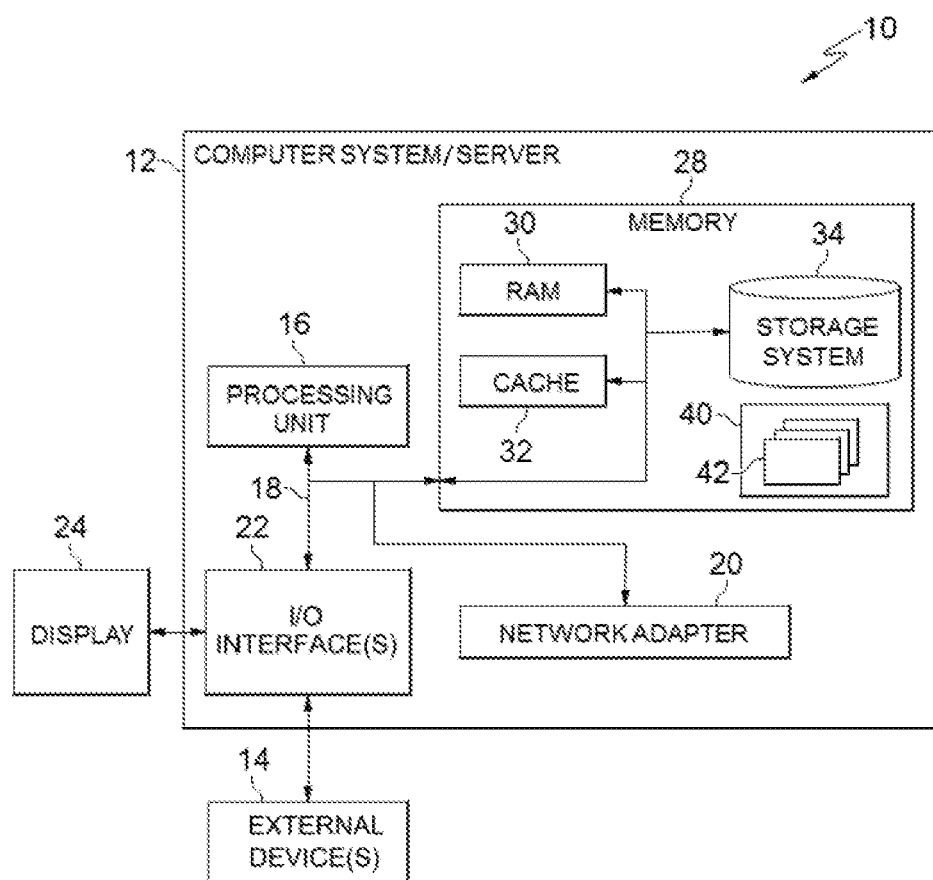
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
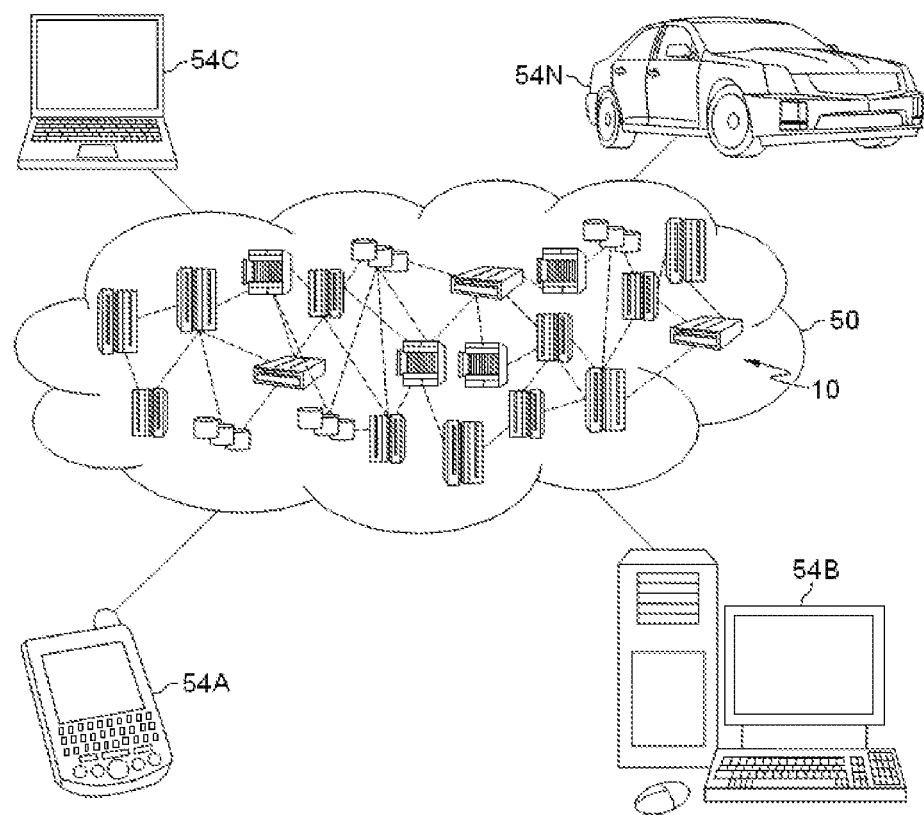
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
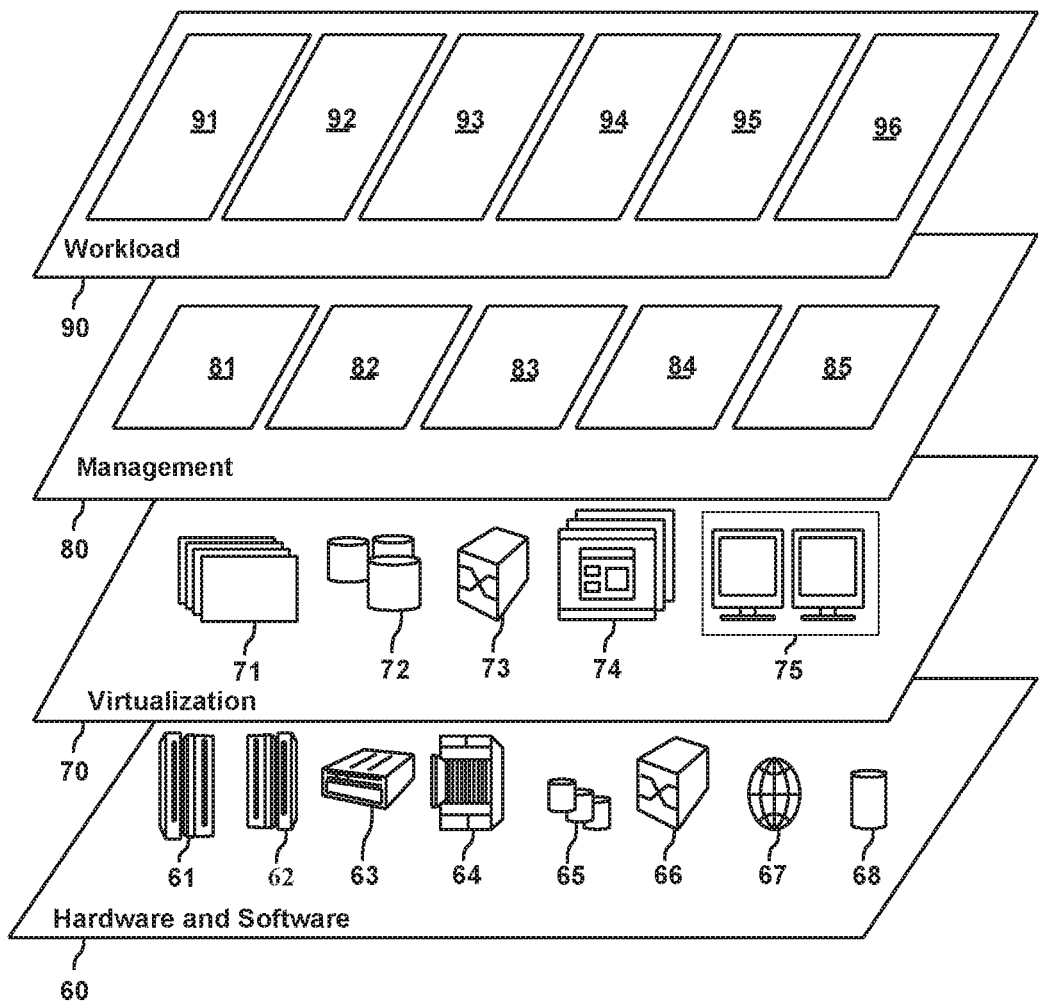
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security policy management for database 96.

In a security system, security policies may be used to perform judgements about risk levels of database actions on database objects, such as the risk level of accessing a specific user table. The security system may perform the judgements one by one. Once the security system determines that the risk level is above a threshold, it may perform one or more security system actions, such as blocking the database action, and alerting an administrator of the security system.

In some scenarios, the security system may need to monitor a large number of items in the database, and thus may define a large number of security policies for the database accordingly. The items to be monitored (referred to as "items" hereinafter) may be stored in the form of an item table. When a judgement is performed, the items in the item table may be retrieved. In order to facilitate item retrieval from the item table, one or more index tables may be created for one or more columns of the item table. For example, items in one column of the item table may be used as keys for creating an associated index table. The index table may include a plurality of index entries, each of which contains a key and a row ID (RID) indicating a row address of the key in the item table. In this way, the index entries are associated with the items in the item table.

The index entries in the index table are arranged in ascending order or descending order of their keys, such that searching for a target key in the index table will consume fewer computing resources than searching for the target key in the item table. After the target key is retrieved from the index table, a RID associated with the target key is utilized to find a corresponding row in the item table.

Generally, the index entries associated with the items are maintained in the form of a B-tree structure. The B-tree may include several levels of non-leaf pages and leaf pages associated with the index entries. In order to facilitate the access to the index entries, a part of the pages may reside in a buffer pool, and remaining pages may be fetched to the buffer pool when any index entry associated therewith is accessed. Therefore, in some circumstances, some pages may be fetched to and deleted from the buffer pool frequently, which may not only involve expensive computation and thus be time-consuming, but may also have a long-term risk of system stability due to the large consumption of resources.

In an embodiment, the items may have several categories, such as the database actions, the database objects, and the like. Conventionally, the index entries associated with different categories of items may be managed by different B-trees. For example, a B-tree may be utilized to manage the index entries associated with the database actions, and another B-tree may be utilized to manage the index entries associated with the database objects. And ever for the security system actions, a single B-tree may be built for the index entries associated therewith. Since the index entries associated with a same security policy may be managed by several B-trees, when one judgement is performed, the several B-trees may need to be traversed through to retrieve the associated index entries. Therefore, the traversal time may be longer, and the effectiveness of a time-sensitive security system may be influenced.

Figure 4:
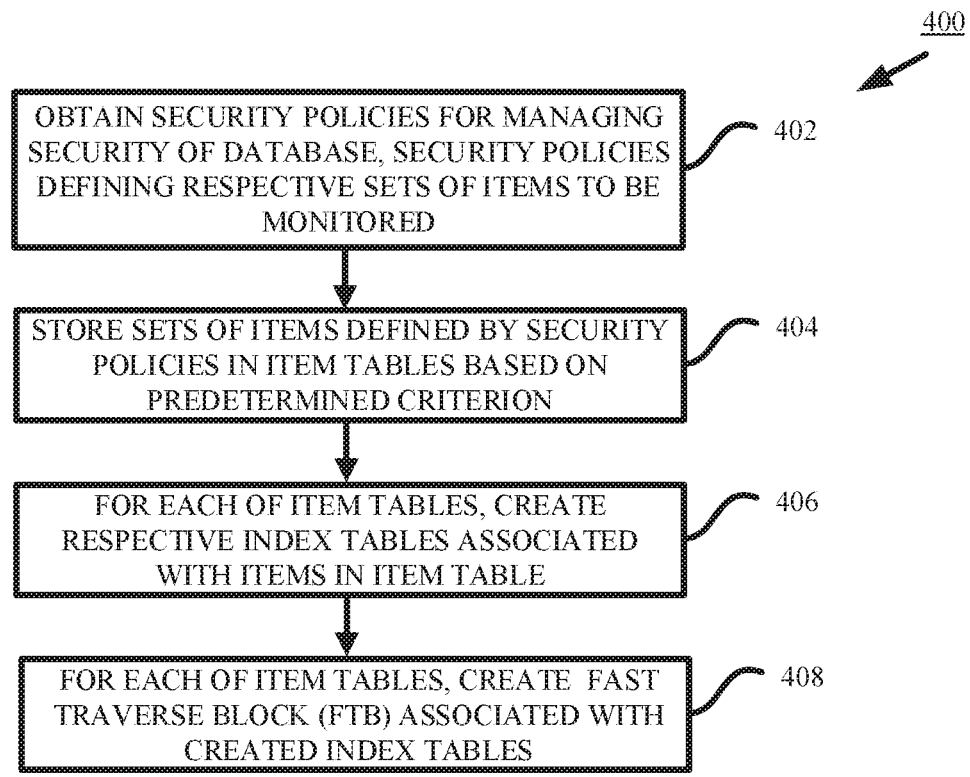
FIG. 4 depicts a schematic flowchart of an approach for managing security policies defined for a database according to an embodiment of the present invention.

With reference now to FIG. 4, a schematic flowchart of process 400 for managing security policies defined for a database according to an embodiment of the present disclosure is depicted. This embodiment will be described in detail below in conjunction with the figures.

In process 400 as shown in FIG. 4, at block 402, process 400 obtains a plurality of security policies for managing security of a database. The security policies may define respective sets of items to be monitored. The number of items in each set may be one or more. As mentioned above, the items may include the database actions and the database objects. The database actions may include Structured Query Language (SQL) SELECT, INSERT, UPDATA, DELETE, executing, running utilities, issuing commands, access, and the like. The database objects may include user tables, views, materialized query table, plans, packages, routines, CHECK DATA, DIAGNOSE, LISTDEF, LOAD, REBUILD INDEX, RECOVER, REORG, REPAIR, REPORT, UNLOAD, ALTER UTILITY, TERM UTILITY, catalog tables and the like.

The plurality of security policies may be directly inputted into the security system by a user, or may be created by the security system according to a security requirement defined by the user. In an example, a security policy may be alerting the user once a specific user table is accessed. In another example, a security policy may be blocking the access to the database once a recovering application is being executed.

At block 404, process 400 stores the sets of items defined by the plurality of security policies, respectively, in one or more item tables based on a predetermined criterion. The predetermined criterion may include security policy relevance, security policy structures, and available spaces in the item tables. In an example, the sets of items may be grouped as several groups based on the predetermined criterion. The grouped sets of items may be referred to as similar sets of items. Then the groups may be stored in the one or more item tables respectively.

In an embodiment, the security policy relevance may be determined in terms of one or more of security management modules, database actions, and database objects. The security management modules may include a sysadm module, a sysctrl module, a DBADM module, a DATAAccess module, an Accessctrl module, and the like. Each security management module may involve the respective database actions and database objects.

In an embodiment, if two or more security policies are associated with a same management module, then the two or more security policies may have high security policy relevance. Similarly, if two or more security policies define a same database action and/or a same database object to be monitored, then the two or more security policies may have high security policy relevance.

More specifically, in an example, if a reference security policy is about alerting the user once a specific user table is accessed, then the security policies relating to access may be considered as having higher relevance with respect to the reference security policy than those, for example, relating to executing an application. Further, the security policies relating to access to the specific user table may be considered as having higher relevance with respect to the reference security policy than those, for example, relating to access to the other tables.

In an embodiment, the security policy structure may be related to, for example, the number of items to be monitored by the security policy, and/or the number of security system actions to be taken. For example, if a reference security policy has three items to be monitored, then the security policy having three items to be monitored may have a more similar structure, with respect to the reference security policy, than the security policy having two items to be monitored.

At block 406, for each of the item tables, process 400 creates one or more respective index tables associated with the items in the item table. As mentioned above, the items in one column of the item table may be used as keys for creating an associated index table. The items in another column of the item table may be used as keys for creating another associated index table. Each index table may include a plurality of index entries. Each index entry may contain the key and the RID indicating the row address of the key in the item table.

At block 408, for each of the item tables, process 400 creates a fast traverse block (FTB) associated with the created one or more index tables. In an embodiment, for each of the item tables, a copy of the non-leaf data of the created one or more index tables may be stored in a new area, separated from the buffer pool, in the form of the FTB structure. More specifically, the copy may be stored in the form of a CPU level2 index structure.

Figure 5:
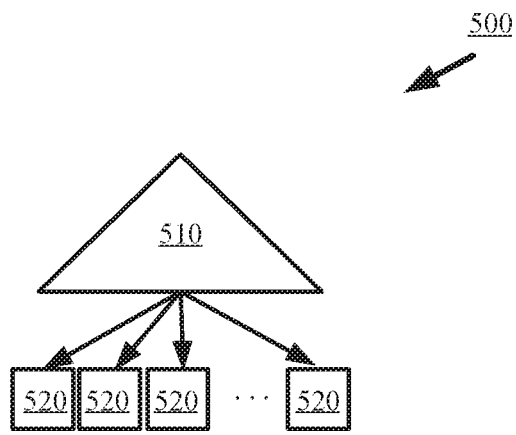
FIG. 5 depicts an illustrative diagram of an example fast traverse block (FTB) according to an embodiment of the present invention.
Figure 6:
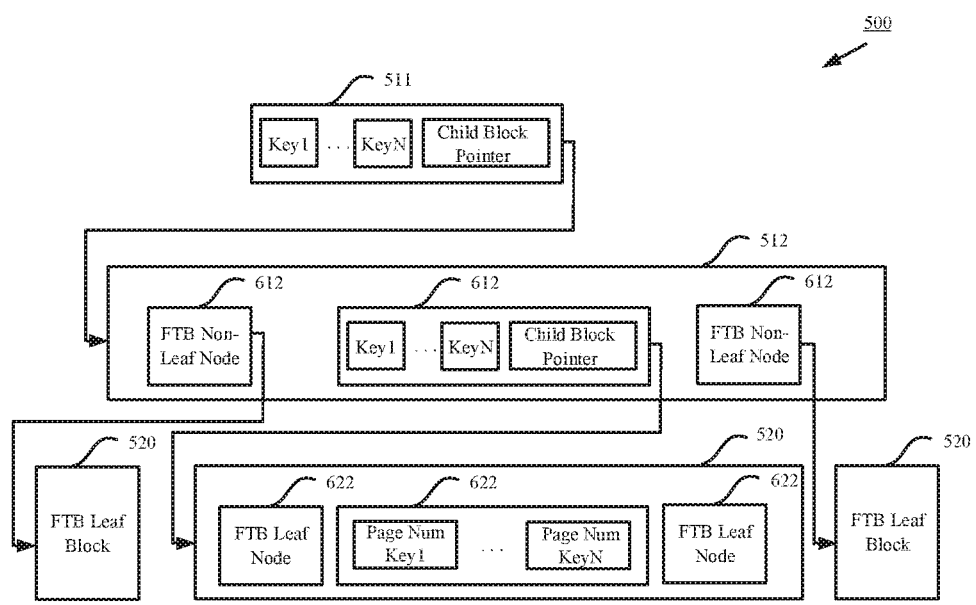
FIG. 6 depicts a block diagram of the example FTB depicted by FIG. 5 according to an embodiment of the present invention.

FIG. 5 depicts an illustrative diagram of an example FTB 500 according to an embodiment of the present disclosure. As shown in FIG. 5, the FTB 500 includes only two levels: a first level 510 and a second level comprising a plurality of leaf blocks 520. FIG. 6 depicts a block diagram of the example FTB depicted by FIG. 5 according to an embodiment of the present disclosure. In the embodiment, the first level 510 may include a root node 511 and a non-leaf block 512. The non-leaf block 512 may include a plurality of FTB non-leaf nodes 612. The root node 511 may declare a node format of the FTB non-leaf nodes 612. As declared by the root node 511, each FTB non-leaf node 612 may include a plurality of keys, Key1 to KeyN, and a child block pointer which points to an associated leaf block 520. The leaf block 520 may include a plurality of FTB leaf nodes 622. Each FTB leaf node 622 may include many pairs of page number and key. The page number may indicate the leaf page of the associated index table to store the key in a same pair. In this way, the FTB structure may reduce the time of retrieving the leaf page of the index table, since a lot of unrelated non-leaf pages may not need to be loaded into the buffer pool in this case.

The nodes of the FTB may be aligned at L2 cache line boundary and locking may be implemented with a one-time compare-and-swap machine instruction. In the embodiment, all of the generated index entries associated with one security policy may be stored in a same FTB. Therefore, when one judgement is performed, only one FTB may need to be traversed through, which may also decrease the traversal time. In addition, since the similar sets of items are grouped together, when one common item is retrieved, there may be only one FTB need to be traversed through, which may further decrease the traversal time. Further, since the similar sets of items are grouped together, the column numbers of the respective item tables may be reduced. Therefore, the size of each non-leaf node of the associated FTBs may be reduced. In the example of FIG. 6, the number of keys at each FTB non-leaf node 612 may be reduced. This may also help decreasing the traversal time. Thus, this kind of FTB may be referred to as Block Traverse Accelerator (BTA) in the embodiment.

From the above, process 400 may decrease the index entry traversal complexity and time. Therefore, it may provide a more prompt response to the judgement of the database actions, and thus increasing the effectiveness of the time-sensitive security system.

In an embodiment, back to FIG. 4, at block 404, process 400 stores each of the sets of items in the item table along with its associated security system action to be taken as defined by a same security policy. In this case, alternatively or additionally, the security policy relevance may be determined in terms of the security system actions. For example, if two or more security policies define a same security system action to be taken, then they may have high security policy relevance. More specifically, in an example, if a reference security policy is about alerting a specific user once a user table is accessed, then the security policies relating to alerting the specific user may be considered as having higher relevance with respect to the reference security policy than those, for example, relating to alerting another user.

Since the items and the security system actions defined by the same security policy are stored in the same item table, the traverse time for the security policy may be shorter than that of the conventional approaches, in which the security system actions are stored in a separate table.

Figure 7:
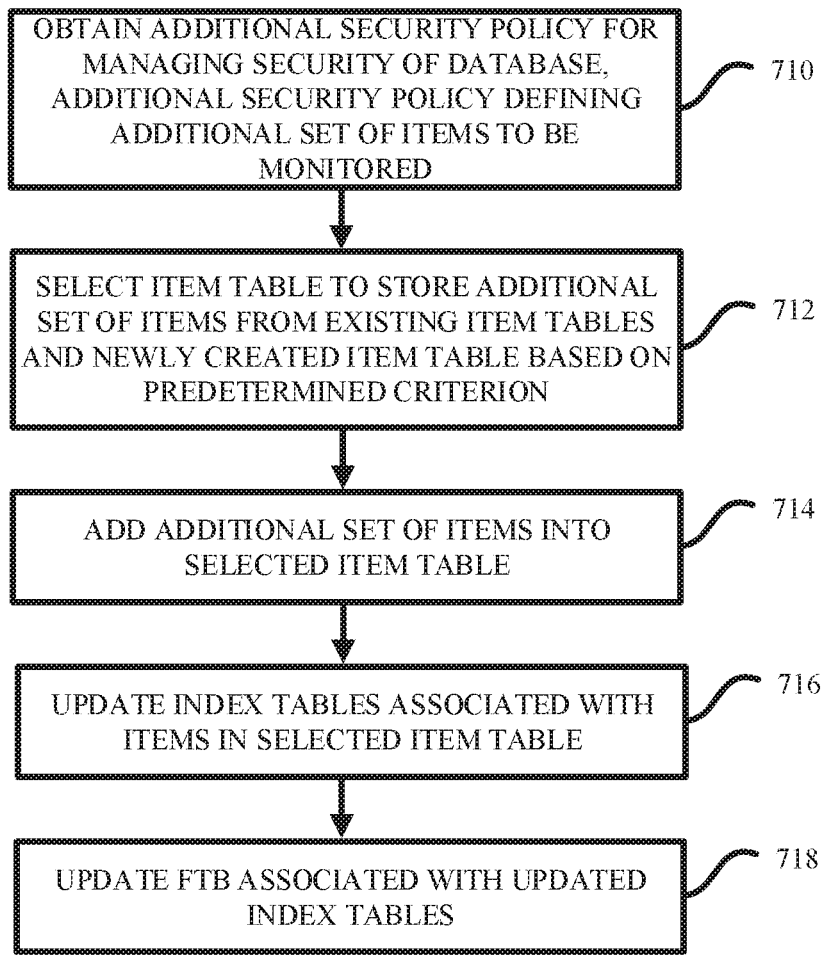
FIG. 7 depicts a schematic flowchart of additional steps of the approach of FIG. 4 according to an embodiment of the present invention.

In practice, there may be one or more additional security policies added into the security system. FIG. 7 depicts a schematic flowchart of additional steps of process 400 of FIG. 4 to process any additional security policy from the security system, according to an embodiment of the present invention.

At block 710, process 400 obtains an additional security policy for managing the security of the database. The additional security policy defines an additional set of items to be monitored. The additional set of items may be related or unrelated to the sets of items in existing item tables.

At block 712, process 400 selects an item table to store the additional set of items from the existing item tables and a newly created item table, based on the predetermined criterion as described at block 404 of FIG. 4. The existing item tables and the newly created item table may be referred to as candidate item tables hereinafter.

For example, the selected item table may have enough available space to accommodate the additional set of items. If the additional set of items to be added may occupy, for example, at least 1 KB space, then the candidate item tables having more than 1 KB available space may be considered as eligible item tables. Next, the security policies associated with the eligible item tables may be compared with the additional security policy. The eligible item table which is associated with the security policy having the highest relevance and the most similar structure with respect to the additional security policy may be the selected item table.

Process 400 may determine the relevance as described at block 404 of FIG. 4. After comparing the eligible item tables, the eligible item tables associated with the security policies having the highest relevance may be preliminarily selected.

It is to be noted that the number of preliminarily-selected item tables may be more than one in some cases. Then, the structures of security policies associated with the preliminarily-selected item tables may be compared. For instance, there may be a first item table associated with a first security policy about altering the user and blocking the database once the specific user table is accessed, and a second item table associated with a second security policy about altering the user once the specific user table is accessed by another user through a specific command. In an example, the additional security policy may be altering the user once the specific user table is accessed. Then, in the structure aspect, the first security policy may be more similar, with respect to the additional security policy, than the second security policy.

In some circumstances, there may be no candidate item table having enough available space to accommodate the additional set of items, that is, there may be no eligible item table. In such a circumstance, the selected item table may be the newly created item table. In some other circumstances, the security policies associated with the eligible item tables may not have relevance or similar structure with respect to the additional security policy. In this case, the selected item table may also be the newly created item table.

It is to be noted that the way of selecting the item table is not limited to the above example. For example, those skilled in the art recognize that process 400 may compare the security policy structure prior to comparing the security policy relevance.

At block 714, process 400 adds additional set of items into the selected item table. The position, in the selected item table, to add the additional set of items may not be limited. For example, the additional set of items may be inserted into the beginning of the selected item table. The additional set of items may be inserted into the end of the selected item table. Alternatively, the additional set of items may be inserted into a random row of the selected item table.

At block 716, process 400 updates the one or more index tables associated with the items in the selected item table. For example, process 400 may generate the index entries associated with the respective items of the additional set of items. The generated index entries may be inserted into their corresponding index tables respectively.

At block 718, process 400 updates the FTB associated with the updated index tables. When the generated index entries are inserted into their corresponding index tables, the leaf page of the existing index entries may be changed. Therefore, the page numbers existed in the FTB leaf nodes may need to be changed accordingly. Also, the keys of the generated index entries may be added into the FTB non-leaf nodes, and the leaf page numbers to store the generated index entries may be added into the FTB leaf nodes.

In some circumstances, the security policies defined for the database may be updated. For example, in any of the security policies, the items to be monitored may be changed. Then the changed items may be updated in the associated item table. Next, the associated index tables and the associated FTB may be updated sequentially. Also, a certain security policy may be deleted. Then, the set of items defined by the security policy may be deleted from the associated item table. Next, the associated index tables and the associated FTB may be updated sequentially.

It should be noted that the processing of security policy management for database according to embodiments of this disclosure could be implemented by computer system/server 12 of FIG. 1.

Embodiments of the present invention can provide a computer system for managing an index table associated with a data table. The computer system may comprise one or more processors, a memory coupled to at least one of the processors, and a set of computer program instructions stored in the memory. The set of computer program instructions are executed by at least one of the processors to obtain a plurality of security policies for managing security of a database, the security policies defining respective sets of items to be monitored; store respectively the sets of items defined by the plurality of security policies in one or more item tables based on a predetermined criterion, the predetermined criterion including security policy relevance, security policy structures, and available spaces in the item tables; create for each of the item tables one or more respective index tables associated with the items in the item table; and create for each of the item tables a fast traverse block (FTB) associated with the created one or more index tables.

Embodiment of the present invention can provide a computer program product for managing an index table associated with a data table. The computer program product comprises a computer readable storage medium having program instructions embodied therewith. The program instructions are executable by a processor to obtain a plurality of security policies for managing security of a database, the security policies defining respective sets of items to be monitored; store respectively the sets of items defined by the plurality of security policies in one or more item tables based on a predetermined criterion, the predetermined criterion including security policy relevance, security policy structures, and available spaces in the item tables; create for each of the item tables one or more respective index tables associated with the items in the item table; and create for each of the item tables a fast traverse block (FTB) associated with the created one or more index tables.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processors, a plurality of security policies for managing security of a database, the security policies defining respective sets of items to be monitored, the items comprising a database action and a database object;
    storing respectively, by one or more processors, the sets of items defined by the plurality of security policies in one or more item tables based on a predetermined criterion, the predetermined criterion comprising security policy relevance, security policy structure, and available space in the one or more item tables;
    creating, by one or more processors, for each of the one or more item tables, one or more respective index tables associated with the items in the respective item table; and
    creating, by one or more processors, for each of the one or more item tables, a fast traverse block (FTB) associated with the created one or more respective index tables.

2. The computer-implemented method of claim 1, wherein the security policy relevance is determined based on a selection of the group consisting of security management modules, database actions, and database objects.

3. The computer-implemented method of claim 1, wherein each of the sets of items is stored in the respective item table along with an associated security system action to be taken as defined by a security policy.

4. The computer-implemented method of claim 3, wherein the security policy relevance is determined based on a selection from the group consisting of security management modules, database actions, database objects, and security system actions.

5. The computer-implemented method of claim 1, further comprising:
    obtaining, by one or more processors, an additional security policy for managing the security of the database, the additional security policy defining an additional set of items to be monitored;
    selecting, by one or more processors, a first item table to store the additional set of items from existing item tables and a newly created item table based on the predetermined criterion;
    adding, by one or more processors, the additional set of items into the selected first item table;
    updating, by one or more processors, the one or more index tables associated with the items in the selected first item table; and
    updating, by one or more processors, the FTB associated with the updated one or more index tables.

6. The computer-implemented method of claim 5, wherein the selected first item table is selected from the one or more item tables, has enough available space to accommodate the additional set of items, and comprises the items associated with the security policies having highest relevance and most similar structure with respect to the additional security policy.

7. The computer-implemented method of claim 5, wherein the selected first item table is the newly created item table in response to a selection from the group consisting of: no existing item table having enough available space to accommodate the additional set of items; and the security policies associated with the existing item tables having enough available space to accommodate the additional set of items having neither relevance nor similar structure with respect to the additional security policy.

8. The computer-implemented method of claim 1, further comprising:
    updating, by one or more processors, in response to an update of any security policy for managing the security of the database, the associated item table, the associated index tables and the associated FTB.

9. A computer program product comprising:
    one or more computer readable storage media, and program instructions collectively stored on the one or more computer readable storage media, the program instructions comprising:
    program instructions to obtain a plurality of security policies for managing security of a database, the security policies defining respective sets of items to be monitored, the items comprising a database action and a database object;
    program instructions to store, respectively, the sets of items defined by the plurality of security policies in one or more item tables based on a predetermined criterion, the predetermined criterion comprising security policy relevance, security policy structure, and available space in the one or more item tables;
    program instructions to create, for each of the one or more item tables, one or more respective index tables associated with the items in the respective item table; and
    program instructions to create, for each of the one or more item tables, a fast traverse block (FTB) associated with the created one or more respective index tables.

10. The computer program product of claim 9, wherein the security policy relevance is determined based on a selection of the group consisting of security management modules, database actions, and database objects.

11. The computer program product of claim 9, wherein each of the sets of items is stored in the respective item table along with an associated security system action to be taken as defined by a security policy.

12. The computer program product of claim 11, wherein the security policy relevance is determined based on a selection from the group consisting of security management modules, database actions, database objects, and security system actions.

13. The computer program product of claim 9, further comprising:
   obtaining, by one or more processors, an additional security policy for managing the security of the database, the additional security policy defining an additional set of items to be monitored;
   program instructions, collectively stored on the one or more computer readable storage media, to select a first item table to store the additional set of items from existing item tables and a newly created item table based on the predetermined criterion;
   program instructions, collectively stored on the one or more computer readable storage media, to add the additional set of items into the selected first item table;
   program instructions, collectively stored on the one or more computer readable storage media, to update the one or more index tables associated with the items in the selected first item table; and
   program instructions, collectively stored on the one or more computer readable storage media, to update the FTB associated with the updated one or more index tables.

14. The computer program product of claim 13, wherein the selected first item table is selected from the one or more item tables, has enough available space to accommodate the additional set of items, and comprises the items associated with the security policies having highest relevance and most similar structure with respect to the additional security policy.

15. The computer program product of claim 13, wherein the selected first item table is the newly created item table in response to a selection from the group consisting of: no existing item table having enough available space to accommodate the additional set of items; and the security policies associated with the existing item tables having enough available space to accommodate the additional set of items having neither relevance nor similar structure with respect to the additional security policy.

16. The computer program product of claim 9, further comprising:
   program instructions, collectively stored on the one or more computer readable storage media, to update, response to an update of any security policy for managing the security of the database, the associated item table, the associated index tables and the associated FTB.

17. A computer system comprising:
   one or more computer processors, one or more computer readable storage media, and program instructions collectively stored on the one or more computer readable storage media for execution by at least one of the one or more computer processors, the program instructions comprising:
      program instructions to obtain a plurality of security policies for managing security of a database, the security policies defining respective sets of items to be monitored, the items comprising a database action and a database object;
      program instructions to store, respectively, the sets of items defined by the plurality of security policies in one or more item tables based on a predetermined criterion, the predetermined criterion comprising security policy relevance, security policy structure, and available space in the one or more item tables;
      program instructions to create, for each of the one or more item tables, one or more respective index tables associated with the items in the respective item table; and
      program instructions to create, for each of the one or more item tables, a fast traverse block (FTB) associated with the created one or more respective index tables.

18. The computer system of claim 17, wherein the security policy relevance is determined based on a selection of the group consisting of security management modules, database actions, and database objects.

19. The computer system of claim 17, wherein each of the sets of items is stored in the respective item table along with an associated security system action to be taken as defined by a security policy.

20. The computer system of claim 19, wherein the security policy relevance is determined based on a selection from the group consisting of security management modules, database actions, database objects, and security system actions.

* * * * *